United States Patent
Ishikawa et al.

[11] Patent Number: 6,056,501
[45] Date of Patent: May 2, 2000

[54] AXLE TILT CONTROL APPARATUS FOR INDUSTRIAL VEHICLES

[75] Inventors: Kazuo Ishikawa; Takaki Ogawa; Masakatsu Suzuki, all of Kariya, Japan

[73] Assignee: Kabushiki Kaisha Toyoda Jidoshokki Seisakusho, Aichi-ken, Japan

[21] Appl. No.: 09/190,518

[22] Filed: Nov. 12, 1998

[30] Foreign Application Priority Data

Nov. 14, 1997 [JP] Japan ................................. 9-313513

[51] Int. Cl.[7] ......................... B60G 17/005; B66F 9/075; B66F 9/22
[52] U.S. Cl. ................................. 414/636; 280/124.112; 280/755; 187/222; 701/50
[58] Field of Search .............................. 414/21, 632, 633, 414/634, 635, 636; 280/5.508, 124.111, 124.112, 124.113, 754, 755; 187/222; 701/50

[56] References Cited

U.S. PATENT DOCUMENTS

| | | | |
|---|---|---|---|
| 4,093,091 | 6/1978 | Gregg et al. | 414/642 |
| 4,393,959 | 7/1983 | Acker | 280/124.112 X |
| 4,499,541 | 2/1985 | Yuki et al. | 414/636 X |
| 4,511,974 | 4/1985 | Nakane et al. | 414/634 X |
| 4,520,443 | 5/1985 | Yuki et al. | 701/50 |
| 5,011,358 | 4/1991 | Andersen et al. | 187/222 X |
| 5,388,857 | 2/1995 | Wernimont et al. | 280/755 X |
| 5,666,295 | 9/1997 | Bruns | 414/21 X |
| 5,947,516 | 9/1999 | Ishikawa | 280/755 |

FOREIGN PATENT DOCUMENTS

| | | | |
|---|---|---|---|
| 195 38 223 | 4/1997 | Germany | 414/636 |
| 09315125 | 12/1997 | Japan . | |
| 9-309309 | 12/1997 | Japan | 414/636 |

*Primary Examiner*—Robert P. Oleszewski
*Assistant Examiner*—Gerald J. O'Connor
*Attorney, Agent, or Firm*—Morgan & Finnegan, L.L.P.

[57] ABSTRACT

An axle tilt control apparatus for forklifts is disclosed. The forklift includes a rear axle pivotally supported by a body frame and a front axle rigidly fixed to the body frame. A mast is supported at the front portion of the body frame to tilt forward and backward. Forks are supported by the mast to be lifted and lowered. The center of gravity of the forklift in the fore-and-aft direction approaches the front axle as the mast is tilted forward. Pivoting of the rear axle is restricted by the hydraulic cylinder when the height of the forks is higher than a predetermined height determination value and the weight of a load on the forks is heavier than a predetermined weight determination value to improve the vehicle's stability. The weight determination value increases as the mast is tilted forward. When a load on the forks is being unloaded, tilting of the rear axle is permitted regardless of the height of the forks and the weight of the load on the forks. Therefore, the rear axle is not unnecessarily locked.

20 Claims, 7 Drawing Sheets

Fig.5 mast angle θ1 forward θF | θH | rearward θR

AXLE TILT CONTROL APPARATUS FOR INDUSTRIAL VEHICLES

BACKGROUND OF THE INVENTION

The present invention relates to an apparatus that controls tilting of an axle in an industrial vehicle such as a forklift. More particularly, the present invention pertains to an axle tilt control apparatus for locking an axle, which is tiltably supported by a vehicle's body frame, against tilting.

A typical industrial vehicle such as a forklift includes a rear axle that tilts relative to the body frame and a front axle that is fixed to the body frame. The rear axle tilts such that all the wheels always contact the ground even if the vehicle runs over bumps and dips on the road surface. This structure improves the stability of the vehicle.

However, when a load is on the forks, elevating the forks to a relatively high position elevates the center of gravity of the forklift. In this state, tilting of the rear axle inclines the body frame to right or to left and thus destabilizes the vehicle. Also, tilting of the rear axle destabilizes the vehicle when the forklift is traveling at a high speed. An apparatus for locking the rear axle has therefore been proposed. The apparatus monitors the stability of the vehicle based on the weight of the load on the forks, the height of the forks and the speed of the vehicle. When judging that the vehicle will be destabilized, the apparatus locks the rear axle to the body frame against tilting.

The forks are lifted and lowered relative to a mast supported by the body frame. The mast is tilted forward and rearward relative to the body frame. Even if the height of the forks and the weight of the load on the forks remain constant, the center of gravity of the vehicle is changed in accordance with the tilt angle of the mast. Specifically, the center of gravity is moved forward, or approaches the front axle, as the mast is tilted forward. The closer the center of gravity is to the fixed front axle, the more stable the vehicle is. Contrarily, the center of gravity is moved rearward, or approaches the tiltable rear axle, as the mast is leaned rearward. The closer the center of gravity is to the rear axle, the less stable the vehicle is. Therefore, the maximum height of the forks and the maximum weight of the carried load are increased by moving the center of gravity toward the front end of the vehicle. The maximum height and weight refer to maximum values of the height and weight that maintain the stability of the forklift at an acceptable level.

A typical prior art axle tilt control apparatus determines whether to lock the rear axle in accordance with the weight of the load on the forks and the height of the forks. Specifically, the rear axle is locked when the load's weight and the forks' height exceed predetermined determination values. The apparatus does not refer to the location of the forklift's center of gravity, which is moved in accordance with the tilt angle of the masts. In other words, if the center of gravity is changed due to tilting of the masts, the determination values, which determine when the axle is locked, remain unchanged.

As described above, the stability of the vehicle is lowest when the mast is most tilted rearward, that is, the center of gravity is at the most rearward position. Therefore, the determination values are determined when the mast is most tilted rearward. Specifically, the determination values are set to the maximum values of the load's weight and the forks' height when the masts are most tilted rearward. Thus, when the masts are not most tilted rearward, the rear axle may be locked even if the vehicle would be stable without locking the rear axle. In other words, the rear axle may be locked when it is not necessary. This is contrary to the goal of improving the stability of the vehicle by allowing the rear axle to tilt at the appropriate times.

When the rear axle is locked removing the load from the forks causes the rear axle to be unlocked. If the rear axle was locked while tilted, unlocking the rear axle causes the body frame to return to a horizontal position. At this time, the body frame swings to right and to left. As a result, the forks may collide with the bottom surface of the unloaded load.

SUMMARY OF THE INVENTION

Accordingly, it is an objective of the present invention to provide an improved axle tilt control apparatus for industrial vehicles that properly locks and unlocks a pivotal axle.

To achieve the foregoing and other objectives and in accordance with the purpose of the present invention, an axle tilt control apparatus for an industrial vehicle is provided. The vehicle has an axle pivotally supported on a frame, an axle rigidly fixed to the frame and a carrier tiltably supported by the frame for carrying a load. The pivotal axle and the fixed axle are spaced apart by a predetermined distance in the fore-and-aft direction of the vehicle. The center of gravity of the vehicle changes in accordance with tilting of the carrier. The frame becomes more stable in the side-to-side direction as the center of gravity approaches the fixed axle. The apparatus includes a restrictor, a controller, and a changer. The restrictor restricts pivoting of the pivotal axle to stabilize the vehicle. The controller controls the restrictor to restrict pivoting of the pivotal axle when the weight of a load on the carrier is heavier than a predetermined weight determination value. The changer changes the weight determination value in accordance with the fore-and-aft position of the center of gravity of the vehicle.

The present invention also provides an axle tilt control apparatus for an industrial vehicle having an axle pivotally supported on a frame, an axle rigidly fixed to the frame and a carrier supported by the frame. The carrier is tilted, lifted and lowered relative to the frame. The apparatus includes a restrictor and a controller. The restrictor restricts tilting of the pivotal axle to stabilize the vehicle. The controller controls the restrictor to restrict pivoting of the pivotal axle in accordance with the height of the carrier and the weight of a load on the carrier. The controller controls the restrictor to allow tilting of the pivotal axle regardless of the height of the carrier and the weight on the carrier when the load on the carrier is being unloaded.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings.

DETAILED DESCRIPTION OF THE PREFERRED EMBODIMENTS

A forklift 1 having an apparatus according to a first embodiment of the present invention will now be described with reference to FIGS. 1–7. As shown in FIG. 2, the forklift 1 has a pair of driven front wheels 15A and a pair of steered rear wheels 15B. The front wheels 15A are supported by a front axle 50 fixed to a body frame 2. The rear wheels 15B are supported by a rear axle 13, which is tiltably supported by the body frame 2. A mast 3 is arranged on the front of the body frame 2. The mast 3 tilts forward and rearward and includes a pair of outer masts 4a and a pair of inner masts 4b. The lower end of each outer mast 4a is supported by the body frame 2. The inner masts 4b are lifted and lowered along the outer masts 4a.

Each inner mast 4b supports a lift bracket 6, which includes a fork 5. The lift brackets 6, together with the forks 5, are lifted and lowered. A sprocket 7 is provided on the top end of each inner mast 7. A chain (not shown) is engaged with each sprocket 7 and coupled to the corresponding lift bracket 6. A lift cylinder 8 is located on the rear side of each outer mast 4a. The lift cylinder 8 includes a piston rod 8a, which is coupled to the top end of the inner mast 4b. The forks 5 are lifted and lowered by extending and retracting the piston rods 8a. A pair of tilt cylinders 9 are provided on the front of the body frame 2. Each cylinder 9 includes a piston rod 9a. The distal end of each piston rod 9a is coupled to the corresponding outer mast 4a. The outer masts 4a are tilted by extending and retracting the piston rods 9a.

Figure 1:
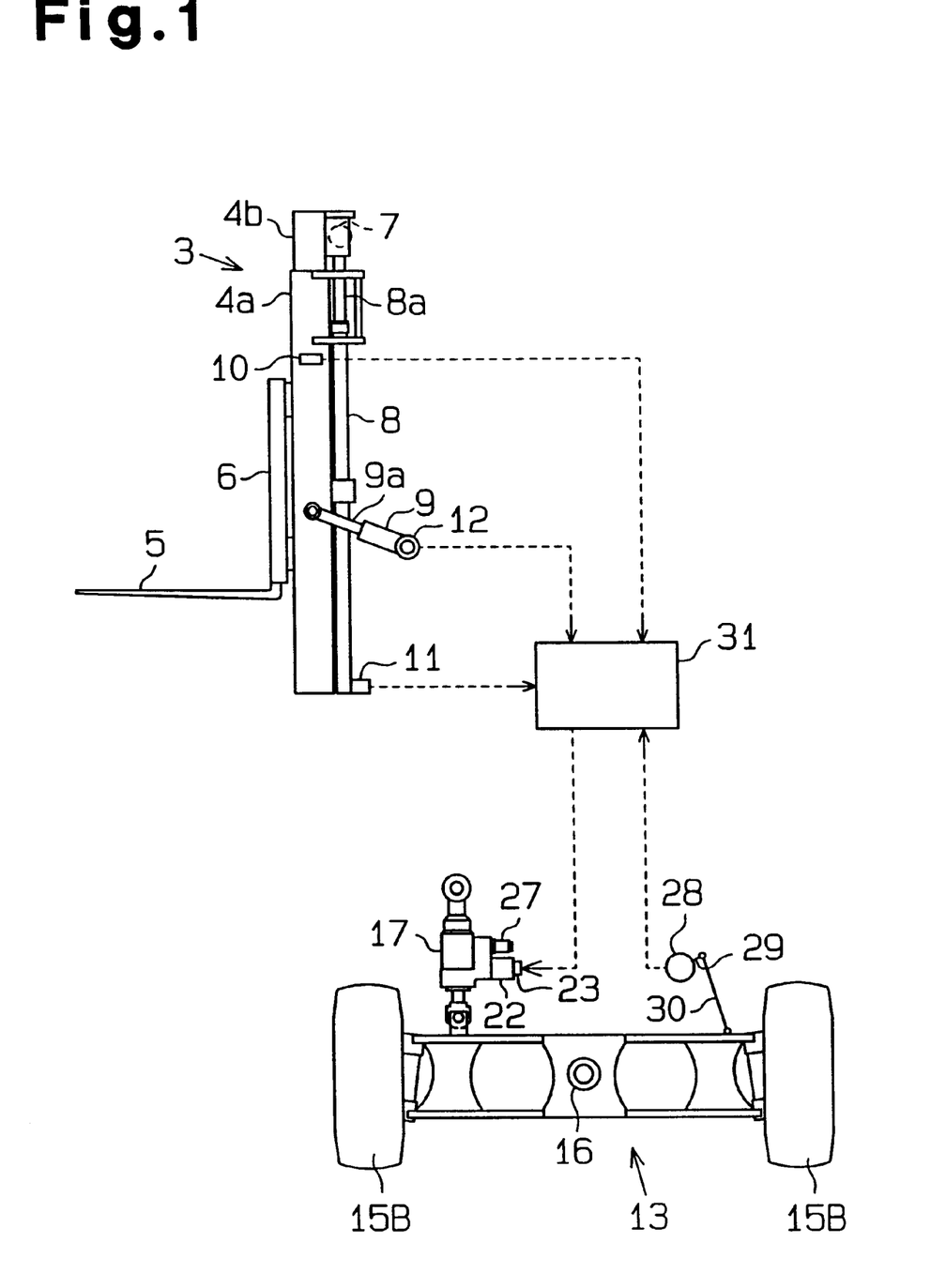
FIG. 1 is a diagrammatic view showing a first embodiment of an axle tilt control apparatus in a forklift according to a first embodiment of the present invention.
Figure 2:
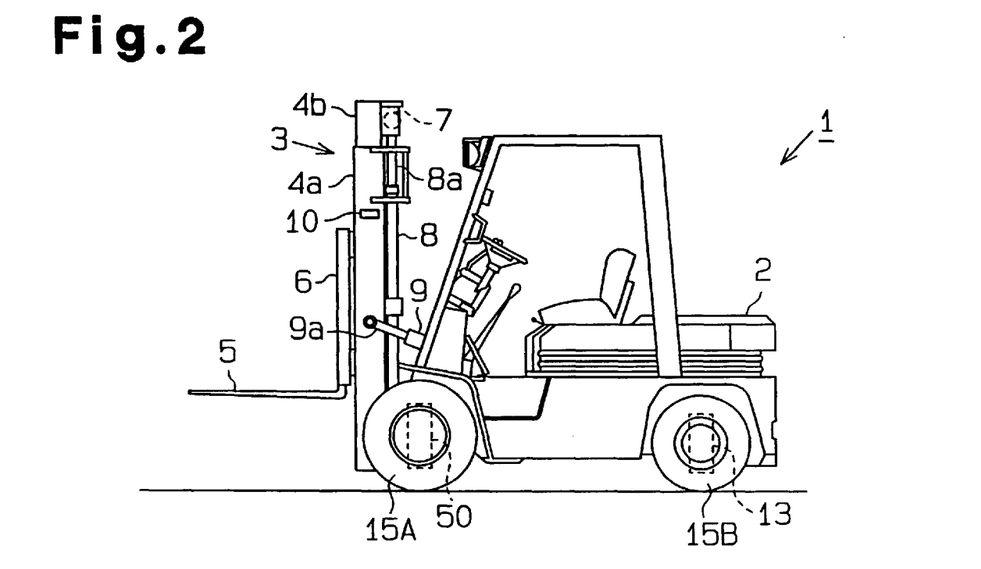
FIG. 2 is a side view illustrating the forklift of FIG. 1.

As shown in FIG. 1, a height sensor 10 is located on one of the outer masts 4a. The height sensor 10 detects the height H of the forks 5. The height sensor 10 includes, for example, a limit switch, and is turned on when detecting a plate dog located on the corresponding inner mast 4b. The height sensor 10 is turned on when the height H of the forks 5 is higher than a predetermined determination value HA, and is turned off when the forks' height H is equal to or lower than a determination value HA.

A pressure sensor 11 is located on one of the lift cylinders 8 to detect oil pressure in the cylinder 8. The pressure sensor 11 includes, for example, a strain gauge, and detects the pressure in the cylinder 8 as indicating the weight W of a load on the forks 5. A mast angle sensor 12 is provided at the proximal end of one of the tilt cylinders 9. The tilt sensor 12 detects the angle θ1 of the outer masts 4a relative to the body frame 2. The angle sensor 12 includes, for example, a potentiometer and detects the angle of the tilt cylinders 9 as indicating the angle θ1 of the masts.

Figure 5:
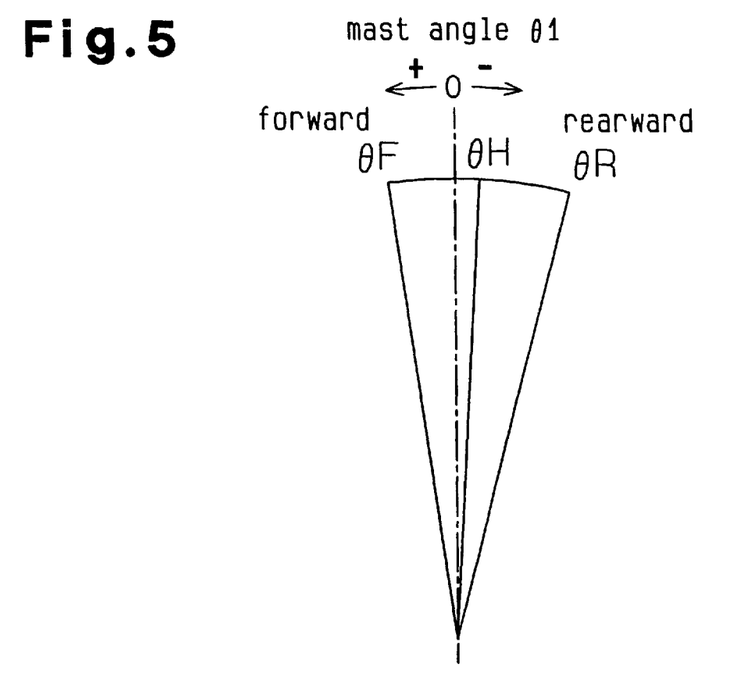
FIG. 5 is a diagram showing the tilt range of a mast.

As shown in FIG. 5, the mast angle θ1 when nothing is placed on the forks 5 and the top surface of the forks 5 is horizontal is defined as zero degrees. The mast angle θ1 when the mast 3 is leaned forward from zero degrees is expressed by a positive value. The mast angle θ1 when the mast 3 is leaned rearward from zero degrees is expressed by a negative value. The maximum forward tilt angle of the mast 3 is θF and the maximum rearward tilt angle is θR.

Figure 3:
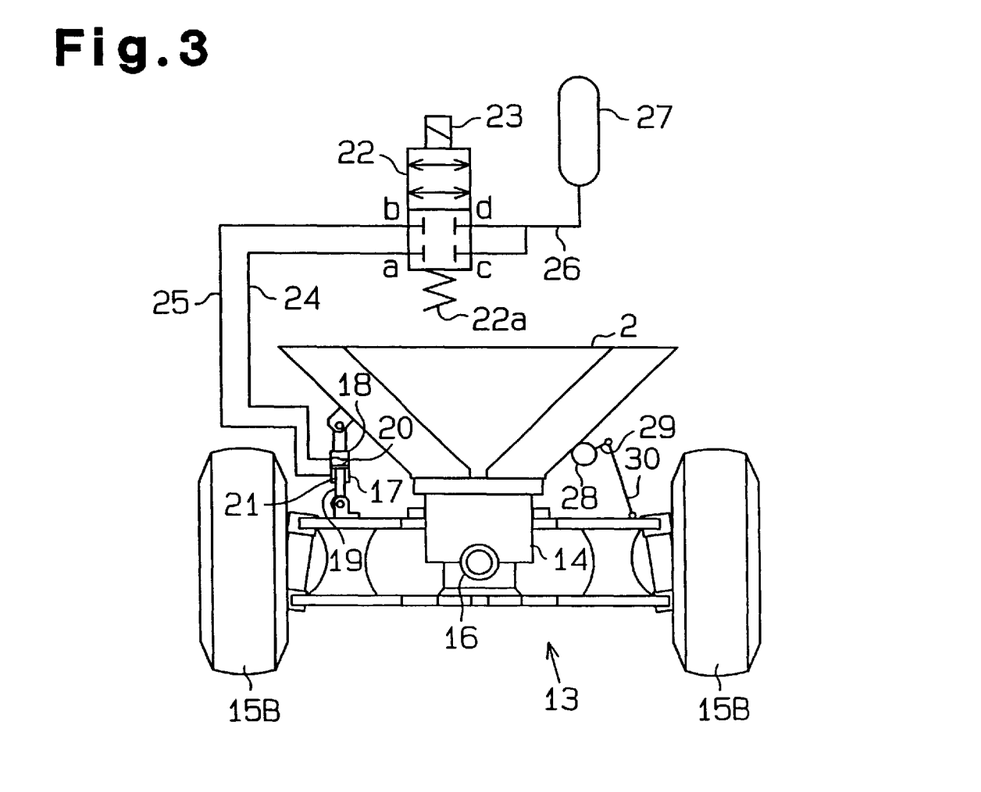
FIG. 3 is a schematic rear view illustrating the body frame and the rear axle of the forklift of FIG. 2.

As shown in FIG. 3, a rear axle 13 extends through the lower rear portion of the body frame 2. The rear axle 13 is secured to a support 14 formed at the bottom of the body frame 2 by a center pin 16. The rear axle 13 pivots about the center pin 16 in a plane parallel to the surface of the sheet of FIG. 3. Rear wheels 15B, which are steered to turn the vehicle, are coupled to the ends of the rear axle 13. When at a neutral position, the rear axle 13 is parallel to a front axle 50 (see FIG. 2), which is fixed to the body frame 2. The rear axle 13 pivots clockwise and counterclockwise relative to the body frame 2 within the same angle. The tilt range of the rear axle 13 is defined by stoppers (not shown).

A multi-movement hydraulic cylinder 17 is located between the body frame 2 and the rear axle 13. The cylinder 17 has a housing 18 and a piston rod 19. The housing 18 is secured to the body frame 2. The piston rod 19 is pivotally secured to the rear axle 13. The cylinder 17 also has a first oil chamber 20 and a second oil chamber 21 defined therein.

As shown in FIG. 1, an electromagnetic valve 22 is integrated with the cylinder 17. The valve 22 is a two-way switching valve that has four ports A, B, C and D. The first oil chamber 20 is connected to the port A by a line 24. The second oil chamber 21 is connected to the port B by a line 25. The ports C, D are connected to an accumulator 27. The valve 22 includes a spool, a solenoid 23 and a spring 22a. The spool is moved between a connection position and a disconnection position by the solenoid 23 and the spring 22a.

When excited, the solenoid 23 puts the spool at the connection position. In this state, the port A is communicated with the port C, and the port B is communicated with the port D. The chambers 20, 21 are therefore connected with each other by the lines 24, 25 and 26. This permits oil to flow between the chambers 20. 21 and the piston rod 19 to move relative to the housing 18. The rear axle 13 is thus tiltable. When the solenoid 23 is de-excited, the spring 22a puts the spool at the disconnection position. The spool then disconnects the ports A, B, C and D thereby prohibiting oil flow between the chambers 20, 21. As a result, the piston 19 fixed to the housing 18 and the rear axle 13 is locked against tilting.

The valve 22 is a normally closed valve, that is, the valve 22 is at the disconnection position when the solenoid 23 is de-excited. The valve 22 and the cylinder 17 selectively permit and prohibit tilting of the rear axle 13.

An axle tilt angle sensor 28 is located on the body frame 2. The tilt angle sensor 28 detects the tilt angle (axle angle) θ2 of the rear axle 13 relative to frame 2. The tilt angle sensor 28 includes, for example, a potentiometer having an input axis (not shown). A lever 29 is secured to the input axis. A connecting rod 30 is pivotally coupled to the distal end of the lever 29. The distal end of the rod 30 is pivotally coupled to the rear axle 13. A control unit 31 shown in FIG. 1 is mounted on the body frame 2 for controlling maneuver of the forklift 1.

Figure 4:
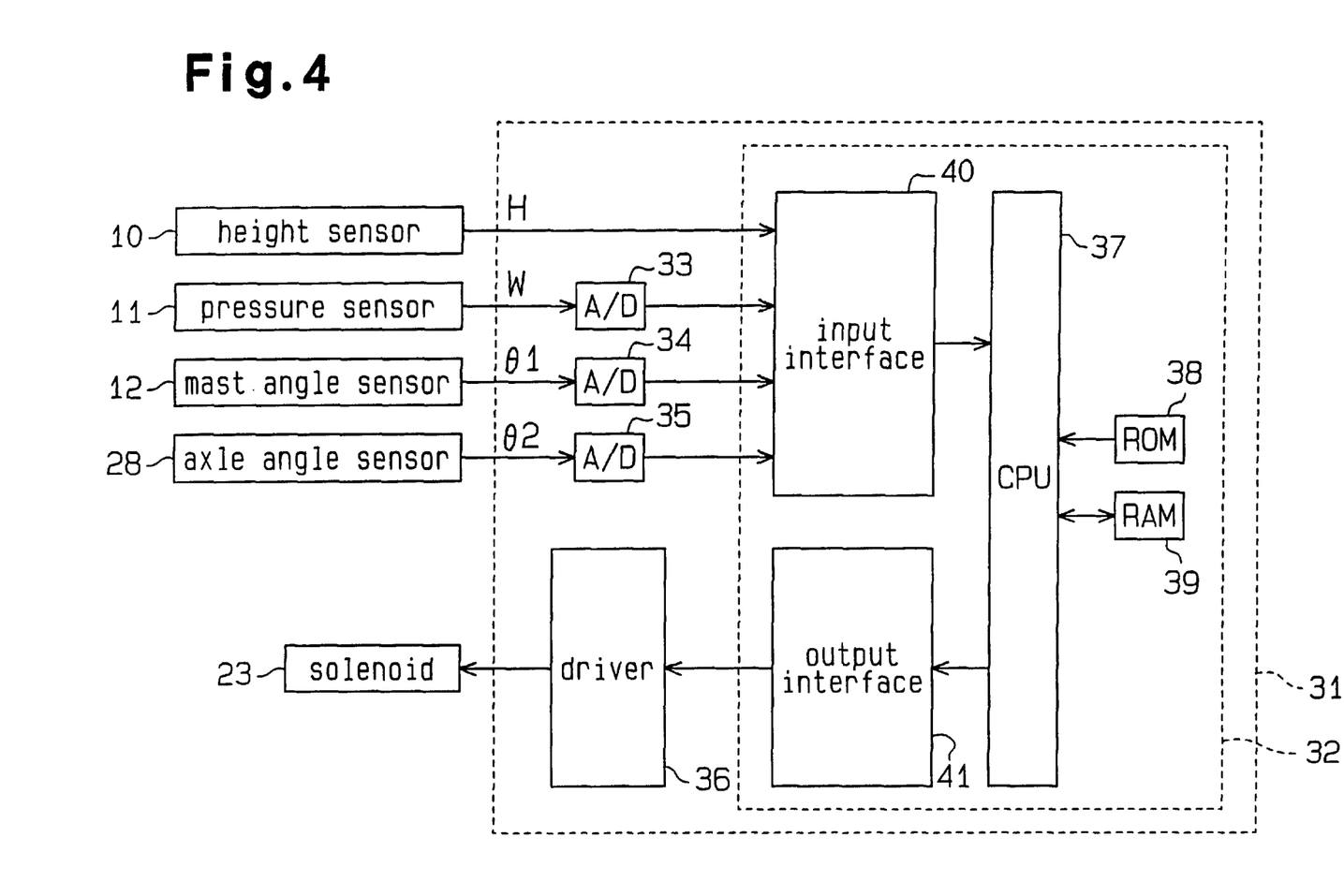
FIG. 4 is a block diagram showing an electric configuration of the axle tilt control apparatus of FIG. 1.

The electric configuration of the axle tilt control apparatus will now be described with reference to FIG. 4. The control unit 31 includes a microcomputer 32, analog-to-digital (A/D) converters 33, 34, 35 and a driver 36. The microcomputer 32 includes a central processing unit (CPU) 37, a read only memory (ROM) 38, a random access memory (RAM) 39, an input interface 40 and an output interface 41.

The CPU 37 is connected to the pressure sensor 11, the mast angle sensor 12 and the axle angle sensor 28 by the A/D converters 33–35 and the input interface 40. The CPU 37 is also connected to the height sensor 10 by the input interface 40. The CPU 37 is further connected to the solenoid 23 of the valve 22 by the driver 36 and the output interface 41. The CPU 37 selectively excites and de-excites the solenoid 23 through the driver 36.

The height sensor 10 outputs a signal (an ON signal or an OFF signal) to the control unit 31 in accordance with the height H of the forks 5. The pressure sensor 11 outputs an analog signal to the control unit 31 in accordance with the weight W of a load on the forks 5. The mast angle sensor 12 outputs an analog signal to the control unit 31 in accordance with the mast angle $\theta 1$. The axle angle sensor 28 outputs an analog signal to the control unit 31 in accordance with the axle angle $\theta 2$.

The ROM 38 stores programs such as an axle tilt control program. The tilt control is a control for improving the stability of the vehicle by permitting and prohibiting tilting of the rear axle 13 as required. The tilt control is executed based mainly on the height H of the forks 5, the weight W of a load on the forks 5 and the mast angle $\theta 1$. The values, H, W and $\theta 1$ affect the vertical and fore-and-aft position of the center of gravity of the forklift 1. That is, the tilt control is executed according to the vertical and fore-and-aft position of the forklift's center of gravity.

A lower height H of the forks 5 and a lighter load weight W lower the center of gravity of the forklift 1 and thus improve the side-to-side stability of the body frame 2. A greater fork height H and a heavier load weight W raise the center of gravity of the forklift 1 and thus deteriorate the side-to-side stability of the body frame 2. The side-to-side stability of the body frame 2 refers to the resistance of the body frame 2 against tipping to right or to left.

One of the conditions for locking the rear axle 13 against tilting is therefore satisfied when the fork height H is higher than a predetermined determination value HA and the load weight W is heavier than a predetermined determination value WA. The determination values HA, WA are theoretically calculated or are determined based on tests in consideration of the maximum acceptable values of the height H and the weight W that maintain the acceptable side-to-side stability of the body frame 2. Thus, if the height H is higher than the determination value HA and the weight W is heavier than the determination value WA, the side-to-side stability of the body frame 2 is lower than the acceptable level.

As described above, the height sensor 10 is turned on when the height of the forks 5 is higher than the determination value HA, and is turned off when the height HA is equal to or lower than the value HA. The CPU 37 judges that the height H is higher than the value HA when the sensor 10 is turned on.

Figure 6:
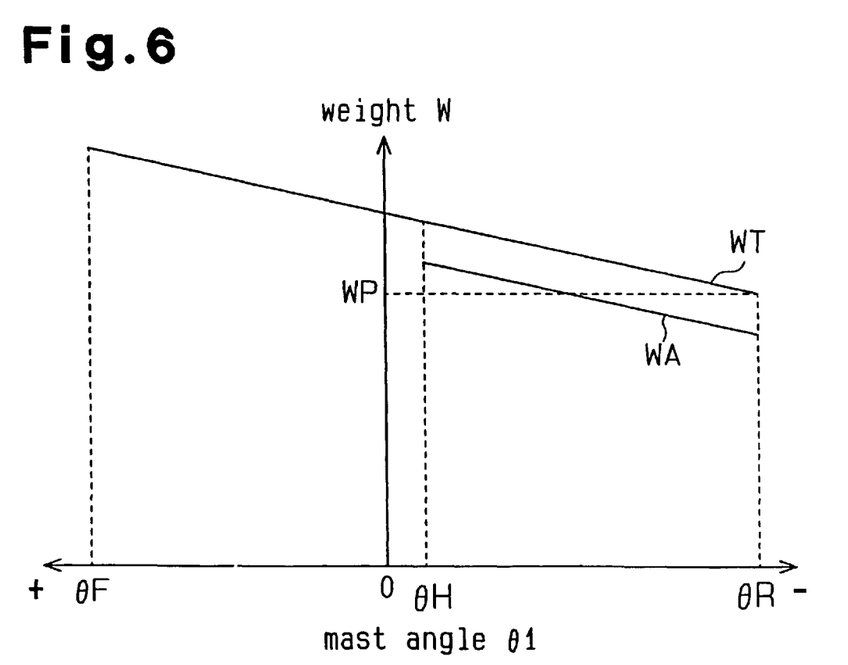
FIG. 6 is a graph showing a map defining the correspondence between the tilt angle of a mast and a weight determination value.

The ROM 38 stores a map shown in FIG. 6. The map shows the relationship between the weight determination value WA and the mast angle $\theta 1$. The value WA increases as the value of the mast angle $\theta 1$ increases, or as the mast 3 tilts forward. That is, as the mast 3 tilts forward, the center of gravity of the forklift 1 is moved forward, or toward the front axle 50. The closer the center of gravity is to the front axle 50, the more stable the body frame 2 is in the side-to-side direction. The maximum acceptable weight WT in the map of FIG. 6 increases as the mast 3 tilts forward. The maximum acceptable weight WT is an upper limit value of the weight on the forks 5 that does not affect the side-to-side stability. The determination value WA is set slightly lower than the value WT and increases as the mast 3 is tilted forward.

As shown in FIG. 6, the maximum acceptable weight WT when the mast angle $\theta 1$ is the maximum tilt angle $\theta R$ is defined as a value WP. The mast angle $\theta 1$ when a load of weight WP is mounted on the forks 5 and the top surface of the forks 5 are horizontal is defined as a reference angle $\theta H$. As shown in FIG. 5, the reference angle $\theta H$ is smaller than zero degrees of the mast angle $\theta 1$. As shown in the map of FIG. 6, the weight determination value WA is defined for a range of the mast angle $\theta 1$ from the maximum rearward tilt angle $\theta R$ to the reference angle $\theta H$ ($\theta R \leq \theta 1 < \theta H$). The value WA is not defined for a range of the mast angle $\theta 1$ from the reference angle $\theta H$ to the maximum forward tilt angle $\theta F$ ($\theta H \leq \theta 1 \leq \theta H$). Therefore, when the mast 3 is at the reference angle $\theta H$ or is tilted further forward, the rear axle 13 is not locked regardless of the height H of the forks 5 and the weight W of a load on the forks 5.

Another condition for locking the rear axle 13 is satisfied when the axle angle $\theta 2$ is smaller than a determination value $\theta A$. If the rear axle 13 is locked when the axle angle $\theta 2$ is equal to or greater than the determination value $\theta A$, unlocking the rear axle 13 will cause the body frame 2 to swing side-to-side. To prevent such swinging of the body frame 2 from exceeding an acceptable level when the rear axle 13 is unlocked, the rear axle 13 is not locked when the axle angle $\theta 2$ is equal to or greater than the determination value $\theta A$ regardless of the height H of the forks 5 and the weight W of a load on the forks 5. The determination value $\theta A$ is previously stored in the ROM 38.

An axle tilt control program executed by the CPU 37 will now be described with reference to the flowchart of FIG. 7. The CPU 37 executes the control at predetermined time intervals during operation of the forklift 1.

At step S10, the CPU 37 reads the height H of the forks 5 (specifically, an ON signal or an OFF signal), the weight W of a load on the forks 5, the mast angle $\theta 1$ and the axle angle $\theta 2$ based on signals from the sensors 10–12 and 28.

At step S11, the CPU 37 judges whether the axle angle $\theta 2$ is smaller than the predetermined determination value $\theta A$. If the axle angle $\theta 2$ is equal to or greater than the determination value $\theta A$, the CPU 37 moves to step S12. At step S12, the CPU 37 sets a lock flag FLG1 to zero, which indicates that conditions for locking the rear axle 13 are not satisfied.

If the rear axle angle $\theta 2$ is smaller than the determination value $\theta A$ at step S11, the CPU 37 judges that one of the conditions for locking the rear axle 13 is satisfied and moves to step S13. At step S13, the CPU 37 judges whether the mast angle $\theta 1$ is smaller than the reference value $\theta H$, or whether the mast 3 is tilted rearward beyond the reference angle $\theta H$. If the mast angle $\theta 1$ is equal to or greater than the reference angle $\theta H$, that is, if the mast 3 is tilted forward by more than the reference angle $\theta H$, the CPU 37 judges that the rear axle 13 does not need to be locked and moves to step S12.

If the mast angle $\theta 1$ is smaller than the reference value $\theta H$ at step S13, the CPU 37 judges that there is a value of the weight determination value WA that corresponds to the current mast angle $\theta 1$ and moves to step S14. At step S14, the CPU 37 defines the determination value WA that corresponds to the current mast angle $\theta 1$ referring to the map of FIG. 6.

At step S15, the CPU 37 judges whether the height H of the forks 5 is higher than the determination value HA and whether the weight W on the forks 5 (the load) is heavier than the determination value WA. If the determination is negative, the CPU 37 judges that the rear axle 13 does not need to be locked and moves to step S12.

If the determination is positive at step S15, the CPU 37 moves to step S16. At step S16, the CPU 37 sets the lock flag FLG1 to one, which indicates that the conditions for locking the rear axle 13 are satisfied.

The CPU 37 moves to step S17 either from step S12 or from step S16. At step S17, the CPU 37 controls the driver 36 to excite or de-excite the solenoid 23 of the electromagnetic valve 22 based on the value of the flag FLG1. Specifically, the CPU 37 causes the driver 36 to excite the solenoid 23 when the flag FLG is zero. As a result, the piston rod 19 of the hydraulic cylinder 17 is movable and the rear axle 13 is tiltable. If the flag FLG1 is one, the CPU 37 causes the driver 36 to de-excite the solenoid 23. As a result, the piston rod 19 is locked and the rear axle 13 is locked against tilting.

As described above, the weight determination value WA is one of the reference values for determining whether to lock the rear axle 13. The value WA varies in accordance with the tilt angle of the mast 3, or with the fore-and-aft position of the forklift's center of gravity. Particularly, the value WA is increased as the center of gravity is moved forward by tilting the mast 3 forward. The side-to-side stability of the body frame 2 is increased as the mast 3 is tilted forward. A higher side-to-side stability increases the maximum value of the load weight W at which tilting of the rear axle 13 is permitted.

Thus, whether to lock the rear axle 13 is determined based on the vertical and fore-and-aft position of the center of gravity. The rear axle 13 is therefore not locked when unnecessary. Specifically, the rear axle 13 is not locked when the side-to-side stability of the body frame 2 is acceptable. The rear axle 13 is tiltable only when it improves the stability of the forklift 1.

When the forklift 1 travels with a load on the forks 5, the mast 3 is tilted rearward relative to the reference angle $\theta H$. This tilts the top surface of the forks 5 rearward and prevents the load on the forks 5 from falling while the forklift 1 is traveling. For unloading the load, the mast 3 is tilted to the reference angle $\theta H$ or further forward.

When the mast 3 is at the reference angle $\theta H$ or further forward, the CPU 37 does not lock the rear axle 13 regardless of the height H of the forks 5 and the weight W of a load on the forks 5. When the rear axle 13 is locked based on the height H and the weight W, and the mast 3 is tilted forward for unloading the load on the forks 5, the rear axle 13 is unlocked when the mast 3 reaches the reference angle $\theta H$. That is, the rear axle 13 is unlocked while the load on the forks 5 is being unloaded.

The rear axle 13 is not locked when the axle angle $\theta 2$ is equal to or greater than the determination value $\theta A$. However, even if the rear axle 13 is locked when the axle angle $\theta 2$ is smaller than the determination value $\theta A$, unlocking the rear axle 13 swings the body frame 2. If the rear axle 13 is unlocked when the load is being unloaded, swinging of the body frame 2 may cause the forks 5 to collide with the bottom of the load. In this embodiment, the rear axle 13 is not unlocked when unloading a load from the forks 5 but is unlocked before unloading the load. Thus, when the load is being unloaded, swinging of the body frame 2 has already stopped and the forks 5 do not collide with the bottom of the load.

Tilting the mast 3 forward relative to the reference angle $\theta H$ moves the forklift's center of gravity forward and thus improves the side-to-side stability of the body frame 2. Therefore, when the mast 3 is tilted forward relative to the reference angle $\theta H$, the body frame 2 is sufficiently stable regardless of the height H and the weight W without locking the rear axle 13.

The mast angle $\theta 1$ and the fore-and-aft position of the forklift's center of gravity are closely related. Therefore, the mast angle $\theta 1$ is used as a value indicating the fore-and-aft position of the forklift's center of gravity, and the weight determination value WA is varied based on the mast angle $\theta 1$. This method permits easy and accurate control of the tilting of the rear axle 13.

Tilting of the rear axle 13 is controlled by the microcomputer 32. The microcomputer 32 performs the axle tilt control shown in the flowchart of FIG. 7 based on the map of FIG. 6 and a program data stored in the ROM 38. Thus, the weight determination value WA may be applied to other types of vehicles by changing the data stored in the ROM 38.

A second embodiment of the present invention will now be described with reference to FIGS. 8 and 9. The differences from the embodiment of FIGS. 1–7 will mainly be discussed below.

Figure 8:
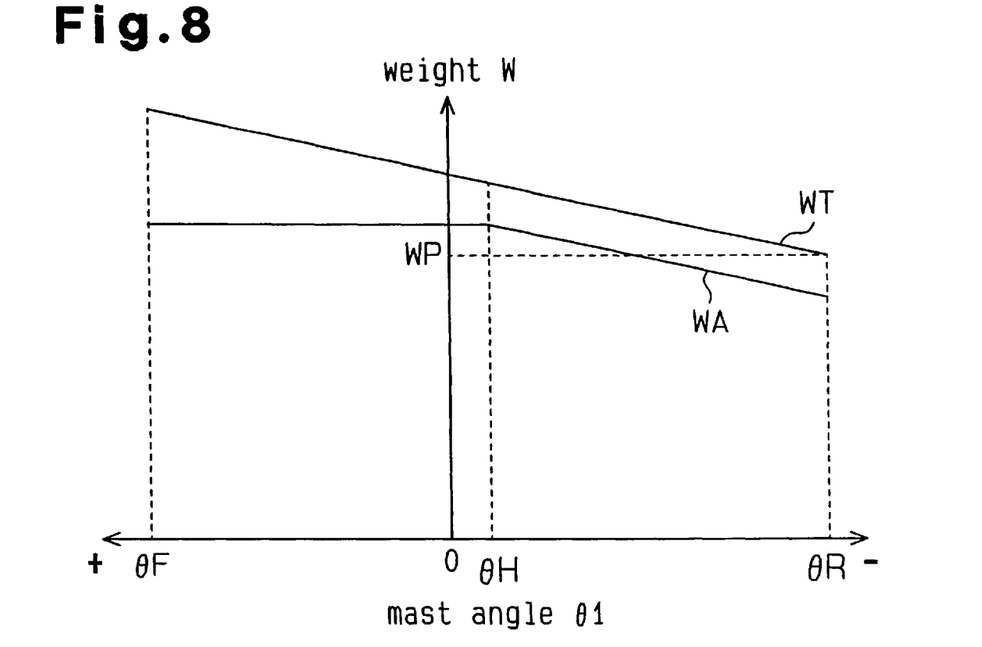
FIG. 8 is a graph showing a map defining the correspondence between the tilt angle of a mast and a weight determination value according to a second embodiment.

In the second embodiment, a map of FIG. 8 is stored in the ROM 38 instead of the map of FIG. 6. The map of FIG. 8 shows the correspondence between the mast angle $\theta 1$ and the weight determination value WA. Unlike the map of FIG. 6, the map of FIG. 8 defines the weight determination value WA in the range of the mast angle $\theta 1$ from the reference angle $\theta H$ to the maximum forward tilt angle $\theta F$ ($\theta H \leq \theta 1 \leq \theta F$), as well as in the range of the angle $\theta 1$ from the maximum rearward tilt angle $\theta R$ to the reference angle $\theta H$ ($\theta R \leq \theta 1 < \theta H$). In the range of the angle $\theta 1$ from the angle $\theta H$ to the angle $\theta F$, the maximum acceptable weight WT increases as the angle $\theta 1$ increases. However, the weight determination value WA remains constant in this range.

A tilt angle control executed by the CPU 37 will now be described with reference to the flowchart of FIG. 9. The CPU 37 executes the control program at predetermined time intervals during operation of the forklift 1.

Figure 7:
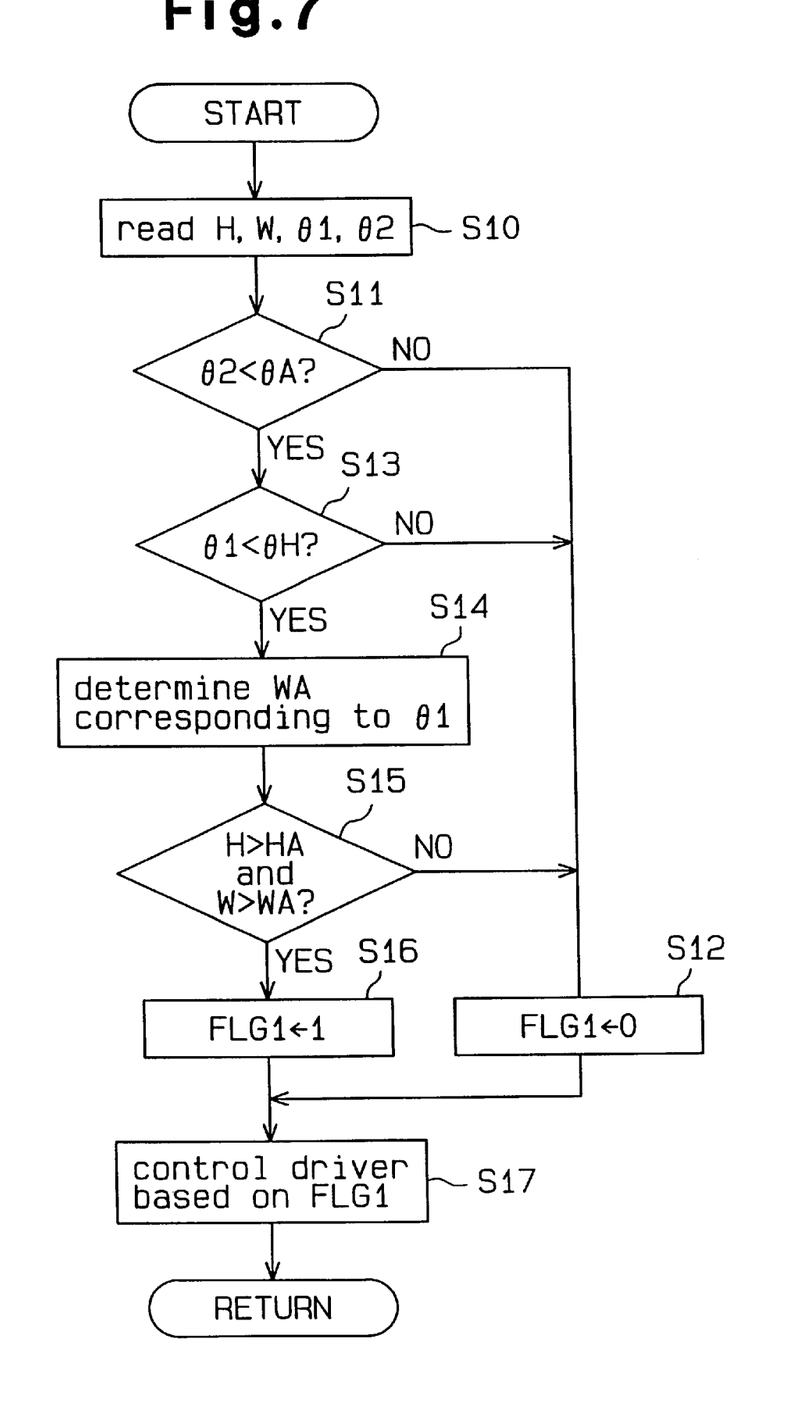
FIG. 7 is a flowchart showing an axle tilt angle control of the first embodiment.

Steps S20, S21, S22 are the same as steps S10, S11, S12 in the flowchart of FIG. 7. That is, at step S20, the CPU 37 reads the height H of the forks 5, the weight W of the load on the forks 5, the mast angle $\theta 1$ and the axle angle $\theta 2$. At step S21, the CPU 37 judges whether the axle angle $\theta 2$ is smaller than a predetermined determination value $\theta A$. If the axle angle $\theta 2$ is equal to or greater than the determination value $\theta A$, the CPU 37 moves to step S22. At step S22, the CPU 37 sets the lock flag FLG1 to zero to allow the rear axle 13 to tilt.

If the axle angle $\theta 2$ is smaller than the determination value $\theta A$ at step S21, the CPU 37 moves to step S23. At step S23, the CPU sets the weight determination value WA that corresponds to the current mast angle $\theta 1$.

At step S24, the CPU 37 judges whether the height H is greater than the height determination value HA and whether the weight W is greater than the weight determination value WA. If the determination is negative, the CPU 37 judges that the rear axle 13 does not need to be locked and moves to step S25. At step S25, the CPU 37 sets a flag FLG2 to zero and moves to step S22. The zero state of the flag FLG2 indicates that the load on the forks 5 is not being unloaded.

If the determination at step S24 is positive, the CPU 37 moves to step S26. At step S26, the CPU 37 judges whether the current mast angle $\theta 1$ is equal to or greater than the reference angle $\theta H$ and judges whether the mast angle $\theta 1$ from the previous routine is smaller than the reference value $\theta H$. In other words, the CPU 37 judges whether the mast 3 has moved from a position rearward of the reference angle $\theta H$ to the position of the reference angle $\theta H$ or further forward. If the determination is positive, the CPU 37 moves to step S27. At step S27, the CPU 37 sets the flag FLG2 to one and moves to step S22. When the flag FLG2 is set at one, the program assumes that the forks 5 are being unloaded.

If the determination is negative at step S26, the CPU 37 moves to step S28. At step S28, the CPU 37 judges whether the flag FLG2 is one. If the flag FLG2 is not one but is zero, the CPU 37 moves to step S29 and sets the flag FLG1 to one for locking the rear axle 13.

If the flag FLG2 is one at step S28, the CPU 37 moves to step S30. At step S30, the CPU 37 judges whether the mast angle θ1 is equal to or greater than the reference angle θH. If the mast angle θ1 is equal to or greater than the reference angle θH, the CPU 37 judges that the load is being removed and moves to step S22. If the mast angle θ1 is smaller than the reference angle θH, the CPU 37 judges that the operation is not unloading and moves to step S31. At step S31, the CPU 37 sets the flag FLG2 to zero and moves to step S29.

The CPU 37 moves to step S32 either from step S22 or from step S29. As at step S17 of FIG. 7, at step S32 of FIG. 9, the CPU 37 controls the driver 36 to excite or de-excite the solenoid 23 of the electromagnetic valve 22 based on the value of the flag FLG1. When the lock flag FLG1 is zero, the rear axle 13 is permitted to tilt. When the flag FLG1 is one, the rear axle 13 is locked against tilting.

The determination of step S26 is positive if the mast 3 has been moved from an angle rearward of the reference angle θH to the reference angle θH or further forward with the rear axle 13 locked. Thus, the flag FLG2 is set to one at step S27. Then, in the subsequent routines, the determination at step S28 is positive and the CPU 37 moves to step S30. Therefore, if the mast 3 is judged to be at the reference angle θH or further forward, the CPU 37 judges that the forklift 1 has been unloading since the determination at step S26 was judged to be positive. The CPU 37 then unlocks the rear axle 13.

If the mast 3 is tilted forward with the rear axle 13 locked, the rear axle 13 is unlocked when the mast 3 reaches the reference angle θH. That is, the rear axle 13 is unlocked when unloading the forks 5. Therefore, as in the embodiment of FIGS. 1–7, the forks 5 do not collide with the bottom of the load when unloading the forks 5.

When loading the forks 5, the mast 3 is at the reference angle θH or further forward. In this case, unlike the embodiment of FIGS. 1–7, the rear axle 13 is locked if the height H of the forks 5 is higher than the reference value HA and the weight W of the load is heavier than the reference value WA when the load is on the forks 5. That is, even if the mast 3 is tilted further forward from the reference angle θH, the axle 13 can be locked based on the height H and the weight W while loading the forks 5. When loading the forks 5, it is preferred that the body frame 2 be very stable in the side-to-side direction. The embodiment of FIGS. 8 and 9 satisfies this requirement.

In the map of FIG. 8, although the maximum acceptable weight WT increases, the weight determination value WA is constant in the range from the reference angle θH to the maximum forward tilt angle θF. Therefore, considering the maximum weight WT, the rear axle 13 is easily locked in the range from θH to θF.

However, when the mast 3 is at the reference angle θH or is further tilted forward, the forklift 1 is unlikely to be traveling. The forklift 1 is, however, very likely to be unloading or loading. When unloading, the rear axle 13 does not need to be locked. However, when loading, it is desirable that the rear axle 13 be locked for stabilizing the body frame 2 in the side-to-side direction. Therefore, it is advantageous for the determination value WA to be constant in the range from the reference angle θH to the maximum forward tilt angle θF. This allows the rear axle 13 to be locked at a lighter weight W in the forward range. The embodiment of FIGS. 8 and 9 also has the advantages of the embodiment of FIGS. 1–7.

It should be apparent to those skilled in the art that the present invention may be embodied in many other specific forms without departing from the spirit or scope of the invention. Particularly, it should be understood that the invention may be embodied in the following forms.

Figure 10:
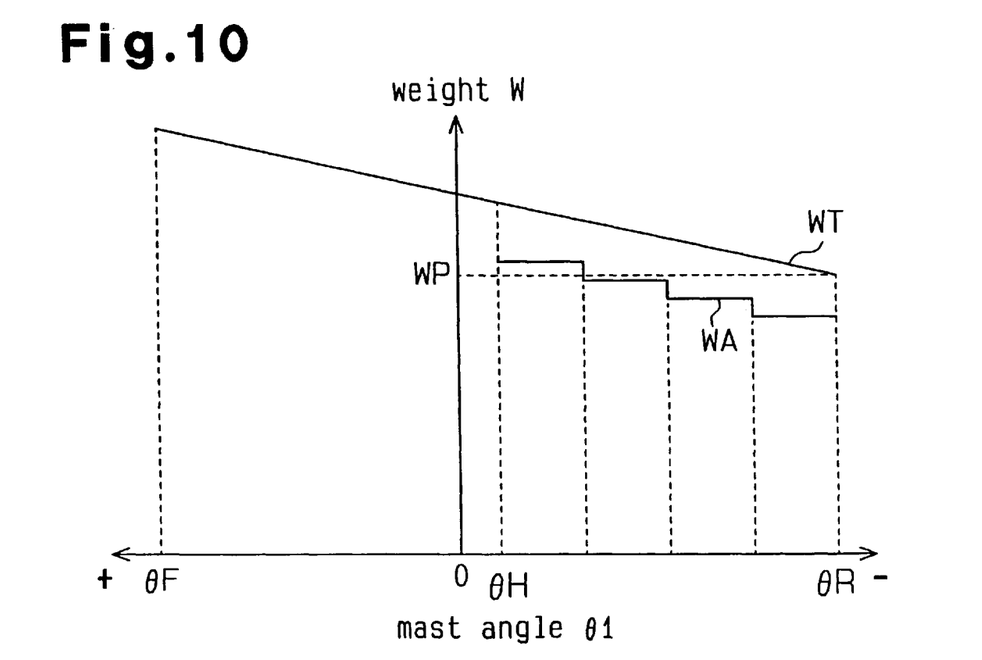
FIG. 10 is a graph showing a map defining the correspondence between the tilt angle of a mast and a weight determination value according to a third embodiment.

FIG. 10 shows a map regarding the weight determination value WA according to a third embodiment. The map of FIG. 10 is a modification of the map of FIG. 6. In the map of FIG. 10, the weight determination value WA varies discretely. The weight determination value WA in the map of FIG. 8 may also vary discretely from the maximum rearward tilt angle θR to the reference angle θH.

In the maps of FIGS. 6 and 8, the weight determination value WA may be constant from the maximum rearward tilt angle θR to the reference angle θH. In this case, the determination value WA does not vary in accordance with the mast angle θ1. However, when the mast 3 is at the reference angle θH or further forward for unloading, the rear axle 13 is unlocked.

In the embodiments of FIGS. 1–10, the mast angle θ1 is used as a value to indicate the fore-and-aft position of the forklift's center of gravity, and the weight determination value WA is varied in accordance with the mast angle θ1 by using the maps of FIGS. 6 or 8. However, the fore-and-aft position of the forklift's center of gravity is also affected by the height of the forks 5. Therefore, the CPU 37 may use a map for determining the determination value WA in accordance with the mast angle θ1 and the height H of the forks 5. Alternatively, in addition to the map of FIGS. 6 or 8, the CPU 37 may use a map that plots a determination value HA of the fork height H in accordance with the mast angle θ1. In this case, the CPU 37 changes the height determination value HA in accordance with the mast angle θ1. Using the height H of the forks 5 for determining whether to lock the rear axle 13 improves the accuracy of the tilt angle control. In these cases, the height sensor 10 has to continuously detect the height H of the forks 5 instead of outputting ON and OFF signals.

In the embodiment of FIGS. 1–10, the maximum acceptable weight value WT when the mast angle θ1 is the maximum rearward tilt angle θR is the value WP, and the reference angle θH is the mast angle θ1 when the top surface of the forks 5 is horizontal with a load of the weight WP on the forks 5. However, the weight that is usually carried by the forks 5 may used for determining the reference angel θH instead of the value WP. That is, the mast angle θ1 when a load of the usual weight is mounted on the forks 5 and the surface of the forks 5 is horizontal may be used as the reference angle θH. This reference angle θH is more suitable for actual usage of the forklift 1.

Alternatively, the reference angle θH may be varied in accordance with the weight W of a load. That is, the CPU 37 may use a map that defines the relationship between the weight W of a load and the mast angle θ1 at which the surface of the forks 5 is horizontal with the load mounted on the forks 5. When a load of a certain weight W is mounted on the forks 5, the CPU 37 sets the mast angle θ1 corresponding to the weight W as the reference angle θH in accordance with the map. This way, the reference angle θH is more suitable for the weight of the actual load. The axle tilt angle control is thus more accurate.

Figure 9:
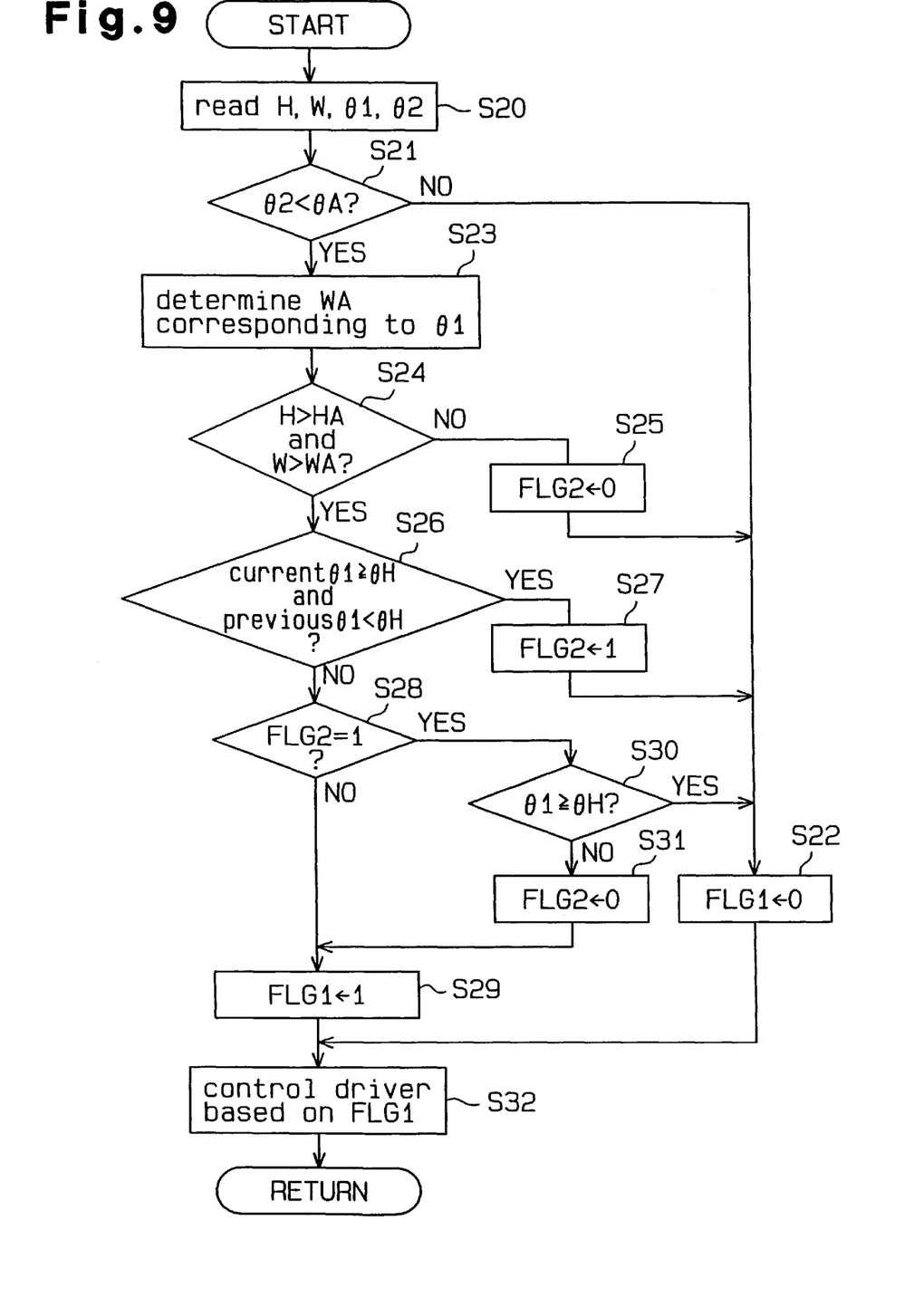
FIG. 9 is a flowchart showing an axle tilt angle control of the second embodiment.

Step 11 of FIG. 7 and step S21 of FIG. 9 may be omitted.

The potentiometer of the mast angle sensor 12 may be replaced with a rotational sensor using an encoder or a Hall element. In the illustrated embodiments, the mast angle sensor 12 detects the angle of the tilt cylinder 9 as the mast angle θ1. However, the sensor 12 may detect the actual angle of the mast 3. Further, the sensor 12 may detect the angle of the mast 3 relative to a vertical line.

Therefore, the present examples and embodiments are to be considered as illustrative and not restrictive and the invention is not to be limited to the details given herein, but may be modified within the scope and equivalence of the appended claims.

What is claimed is:

1. An axle tilt control apparatus for an industrial vehicle having an axle pivotally supported on a frame, an axle rigidly fixed to the frame and a carrier tiltably supported by the frame for carrying a load, wherein the pivotal axle and the fixed axle are spaced apart by a predetermined distance in the fore-and-aft direction of the vehicle, the center of gravity of the vehicle changes in accordance with tilting of the carrier, and wherein the frame becomes more stable in the side-to-side direction as the center of gravity approaches the fixed axle, the apparatus comprising:

a restrictor for restricting pivoting of the pivotal axle to stabilize the vehicle;

a controller for controlling the restrictor to restrict pivoting of the pivotal axle when the weight of a load on the carrier is heavier than a predetermined weight determination value; and a changer for changing the weight determination value in accordance with the fore-and-aft position of the center of gravity of the vehicle.

2. The apparatus according to claim 1, wherein the changer increases the weight determination value as the center of gravity approaches the fixed axle.

3. The apparatus according to claim 2, wherein the pivotal axle is located at the rear of the vehicle, and the fixed axle and the carrier are located at the front of the vehicle, and wherein the center of gravity approaches the fixed axle as the carrier tilts forward.

4. The apparatus according to claim 3, wherein the frame supports a mast such that the mast can tilt forward and backward, the mast supports the carrier such that the carrier is lifted and lowered along the mast, and wherein the apparatus further comprises a detector for detecting a tilt angle of the mast as a value indicating the fore-and-aft position of the center of gravity of the vehicle.

5. The apparatus according to claim 4, wherein the controller controls the restrictor to restrict pivoting of the pivotal axle when the height of the carrier is greater than a predetermined height determination value and the weight of a load on the carrier is greater than the weight determination value.

6. The apparatus according to claim 5, wherein the tilt angle of the mast is defined as a reference angle when a load of a predetermined weight is mounted on the carrier and the carrier is horizontal, wherein the controller controls the restrictor to allow pivoting of the pivotal axle regardless of the height of the carrier and the weight on the carrier when the mast is at the reference angle or further forward.

7. The apparatus according to claim 6, wherein the changer includes a memory that stores map data defining a relationship between the tilt angle of the mast and the weight determination value, wherein the weight determination value varies as a function of the tilt angle of the mast when the mast is tilted rearward of the reference angle in the map data.

8. The apparatus according to claim 5, wherein the controller controls the restrictor to allow pivoting of the pivotal axle regardless of the height of the carrier and the weight on the carrier when the carrier is being unloaded.

9. The apparatus according to claim 8, wherein the tilt angle of the mast is defined as a reference angle when a load of a predetermined weight is mounted on the carrier and the carrier is horizontal, wherein the controller judges that the carrier is being unloaded when the mast is moved from an angle rearward of the reference angle to the position of the reference angle or further forward.

10. The apparatus according to claim 9, wherein the changer includes a memory that stores map data defining a relationship between the tilt angle of the mast and the weight determination value, wherein the weight determination value varies as a function of the tilt angle of the mast when the mast is tilted rearward of the reference angle, and wherein the weight determination value is constant when the mast is tilted forward of the reference angle in the map data.

11. The apparatus according to claim 5, wherein the controller controls the restrictor to allow pivoting of the pivotal axle regardless of the height of the carrier and the weight on the carrier when the pivot angle of the pivotal axle is greater than a predetermined value.

12. An axle tilt control apparatus for an industrial vehicle having an axle pivotally supported on a frame, an axle rigidly fixed to the frame and a carrier supported by the frame, wherein the carrier is tilted, lifted and lowered relative to the frame, the apparatus comprising:

a restrictor for restricting pivoting of the pivotal axle to stabilize the vehicle; and a controller for controlling the restrictor to restrict pivoting of the pivotal axle in accordance with the height of the carrier and the weight of a load on the carrier, wherein the controller controls the restrictor to allow tilting of the pivotal axle regardless of the height of the carrier and the weight on the carrier when the load on the carrier is being unloaded.

13. The apparatus according to claim 12, wherein the pivotal axle is located at the rear of the vehicle, and wherein the fixed axle and the carrier are located at the front of the vehicle.

14. The apparatus according to claim 13, wherein the frame supports a mast such that the mast can tilt forward and backward, and wherein the mast supports the carrier such that the carrier is lifted and lowered along the mast.

15. The apparatus according to claim 14, wherein the tilt angle of the mast is defined as a reference angle when a load of a predetermined weight is mounted on the carrier and the carrier is horizontal, wherein the controller controls the restrictor to allow pivoting of the pivotal axle regardless of the height of the carrier and the weight on the carrier when the mast is at the reference angle or further forward.

16. The apparatus according to claim 14, wherein the tilt angle of the mast is defined as a reference angle when a load of a predetermined weight is mounted on the carrier and the carrier is horizontal, wherein the controller judges that the carrier is being unloaded when the mast is moved from an angle rearward of the reference angle to the position of the reference angle or further forward.

17. An axle tilt control apparatus for a forklift having a rear axle pivotally supported on a frame, a front axle rigidly fixed to the frame, a mast tiltably supported by the front portion of the frame and a fork supported by the mast for carrying a load, wherein the fork is lifted and lowered along the mast, and wherein the rear axle and the front axle are spaced apart in the fore-and-aft direction of the forklift by a predetermined distance, wherein the center of gravity of the forklift approaches the front axle as the mast is tilted forward, and wherein the frame becomes more stable in the side-to-side direction as the center of gravity approaches the front axle, the apparatus comprising:

- a restrictor for restricting pivoting of the rear axle to stabilize the vehicle;
- a controller for controlling the restrictor to restrict tilting of the rear axle when the height of the fork is greater than a predetermined height determination value and the weight of a load on the fork is greater than a predetermined weight determination value, wherein the controller controls the restrictor to allow pivoting of the rear axle regardless of the height of the fork and the weight on the fork when the load on the carrier is being unloaded; and
- a changer for changing the weight determination value in accordance with the tilt angle of the mast, wherein the changer increases the weight determination value as the mast is tilted forward.

18. The apparatus according to claim 17, wherein the tilt angle of the mast is defined as a reference angle when a predetermined weight is supported on the fork and the fork is horizontal, wherein the changer includes a memory that stores map data defining a relationship between the tilt angle of the mast and the weight determination value, wherein the weight determination value varies as a function of the tilt angle of the mast when the mast is tilted rearward of the reference angle in the map data.

19. The apparatus according to claim 17, wherein the tilt angle of the mast is defined as a reference angle when a load of a predetermined weight is mounted on the fork and the fork is horizontal, wherein the changer includes a memory that stores map data defining a relationship between the tilt angle of the mast and the weight determination value, wherein the weight determination value varies as a function of the tilt angle of the mast when the mast is tilted rearward of the reference angle in the map data, and wherein the map data defines a constant weight determination value for tilt angles of the mast that are forward of the reference angle.

20. The apparatus according to claim 17, wherein the controller controls the restrictor to allow pivoting of the rear axle regardless of the height of the fork and the weight on the fork when the pivot angle of the rear axle is greater than a predetermined value.

* * * * *